(12) United States Patent
Schoeley et al.

(10) Patent No.: US 8,497,339 B2
(45) Date of Patent: Jul. 30, 2013

(54) PROCESS FOR THE CONTINUOUS PREPARATION OF CROSSLINKABLE MATERIALS BASED ON ORGANOSILICON COMPOUNDS

(75) Inventors: Peter Schoeley, Diera-Zehren (DE); Uwe Scheim, Coswig (DE)

(73) Assignee: Wacker Chemie AG, Munich (DE)

(*) Notice: Subject to any disclaimer, the term of this patent is extended or adjusted under 35 U.S.C. 154(b) by 1138 days.

(21) Appl. No.: 12/203,176

(22) Filed: Sep. 3, 2008

(65) Prior Publication Data

US 2009/0059719 A1 Mar. 5, 2009

(30) Foreign Application Priority Data

Sep. 3, 2007 (DE) .................. 10 2007 041 857

(51) Int. Cl.
- B01F 7/20 (2006.01)
- B01F 7/04 (2006.01)
- C08G 71/04 (2006.01)
- C07F 7/18 (2006.01)

(52) U.S. Cl.
USPC ............ 528/12; 366/279; 366/290; 524/588; 524/860; 528/901; 528/34; 528/24

(58) Field of Classification Search
USPC ............ 366/279, 290; 524/860, 588; 528/12, 528/24, 901, 34; 525/474
See application file for complete search history.

(56) References Cited

U.S. PATENT DOCUMENTS

| | | | |
|---|---|---|---|
| 3,880,407 A | 4/1975 | List | |
| 3,969,314 A * | 7/1976 | Grigull | 524/425 |
| 4,552,461 A * | 11/1985 | Ott et al. | 366/279 |
| 4,744,668 A * | 5/1988 | Nortey | 366/76.7 |
| 4,950,081 A | 8/1990 | List | |
| 5,407,266 A | 4/1995 | Dötsch | |
| 5,451,637 A * | 9/1995 | Leibfried | 525/105 |
| 5,599,102 A | 2/1997 | Hamada et al. | |
| 5,813,542 A * | 9/1998 | Cohn | 209/581 |
| 5,861,460 A | 1/1999 | Hamada | |
| 6,019,498 A | 2/2000 | Hamada et al. | |
| 6,197,863 B1 * | 3/2001 | Eck et al. | 524/430 |
| 6,809,149 B2 * | 10/2004 | Meyer et al. | 524/590 |
| 7,338,543 B2 * | 3/2008 | Kikawa | 48/180.1 |
| 7,713,626 B2 * | 5/2010 | Meyer et al. | 428/404 |
| 2002/0064086 A1 | 5/2002 | Mori et al. | |
| 2002/0115811 A1 * | 8/2002 | Huang et al. | 528/24 |
| 2011/0040034 A1 * | 2/2011 | Maliverney et al. | 524/860 |
| 2011/0064304 A1 * | 3/2011 | Xiao et al. | 382/165 |
| 2011/0206936 A1 * | 8/2011 | Maliverney et al. | 428/447 |
| 2011/0281969 A1 * | 11/2011 | Maliverney | 523/122 |
| 2011/0305911 A1 * | 12/2011 | Blanc et al. | 428/447 |
| 2012/0031496 A1 * | 2/2012 | Schoeley et al. | 137/1 |

FOREIGN PATENT DOCUMENTS

| | | |
|---|---|---|
| EP | 0688598 A1 | 12/1995 |
| EP | 0 512 730 B1 | 2/1996 |
| EP | 0739652 A1 | 10/1996 |
| EP | 0 857 750 A1 | 8/1998 |
| EP | 1 008 613 A2 | 6/2000 |
| EP | 1210973 A1 | 6/2002 |
| JP | 58196834 A | 11/1983 |
| JP | 02052030 A | 2/1990 |
| JP | 03172403 A | 7/1991 |
| JP | 06233925 A | 8/1994 |
| JP | 08269330 A | 10/1996 |

OTHER PUBLICATIONS

English Abstract corresponding to EP 0 857 750 A, Published date Aug. 12, 1998.

* cited by examiner

*Primary Examiner* — Joseph S Del Sole
*Assistant Examiner* — Nahida Sultana
(74) *Attorney, Agent, or Firm* — Brooks Kushman P.C.

(57) ABSTRACT

The present invention relates to a process for the continuous preparation of mixtures containing organosilicon compound (A) and solid (B) and optionally further components in a mixing unit comprising at least one rotating mixing shaft, wherein at least one mixing shaft makes an angle of inclination with the horizontal of more than 10 degrees and the inlet opening for the solid (B) is arranged higher than the outlet opening.

15 Claims, No Drawings

PROCESS FOR THE CONTINUOUS PREPARATION OF CROSSLINKABLE MATERIALS BASED ON ORGANOSILICON COMPOUNDS

BACKGROUND OF THE INVENTION

1. Field of the Invention

The invention relates to a process for the continuous preparation of mixtures, in particular crosslinkable materials based on organosilicon compounds, which is characterized by low mechanical loading of the material being mixed during mixing of organosilicon compounds and solids, in particular reinforcing fillers.

2. Background Art

Crosslinkable materials based on organosilicon compounds which can be stored in the absence of moisture and crosslink on admission of moisture at room temperature, so-called RTV1 sealing compounds, have long been known. They contain mainly organosilicon compounds having hydrolysable groups and reinforcing fillers such as finely divided silicas. These products are used in large amounts as pointing and sealing materials in the construction industry, where, in addition to good adhesion to various substrates, they must have especially two properties. These are firstly high resistance to deformation when used in the uncured state, and secondly, low resistance to tensile load in the cured state. The resistance to deformation during use, i.e. in particular the resistance during the smoothing process of the pointing, is also referred to by the user as "body". This "body" must be as great as possible according to the requirements of the pointer. Although RTV1 sealing materials are characterized by good mechanical stabilities, i.e. already have a certain resistance to deformation in the uncured state, the user as a rule desires substantially greater resistance to deformation. The resistance of the cured RTV1 sealing compound in the joint under tensile load should generally be low, since this ensures that the action of force on the adhesive surface of the sealing compound with the substrate is as small as possible. If the resistance under tensile loads were high, strong forces would then act on the adhesive surfaces of the RTV1 sealing compound, for example if structure joints become larger as a result of cooling of components. Tearing away of the sealing compound from the substrate will then very quickly become possible and the sealed joint will no longer perform its function.

The two properties described can each be established very readily via the content of reinforcing filler in the RTV1 sealing compound. However, while the resistance to deformation in the uncured state requires high proportions of reinforcing filler in the RTV1 sealing compound, small amounts of reinforcing filler are required for achieving low tensile stress values of the cured RTV1 sealing compound. An upper limit for tensile stress values is obtained, for example, from the standard ISO 11600 Class 25 LM. This requires a tensile stress value at 100 percent elongation (modulus) of a so-called H test specimen of not more than 0.4 MPa. This standard can be complied with only if the proportion of reinforcing fillers in the RTV1 sealing compound is kept as small as possible. Higher proportions of reinforcing fillers rapidly result in a drastic increase in the modulus beyond the acceptable limit. However, no similar standard for ensuring maximum resistance to deformation on pointing exists to date. The known continuously prepared RTV1 sealing compounds therefore contain relatively low proportions of reinforcing fillers because these low proportions ensure compliance with the standard for a low modulus, mentioned above by way of example. The disadvantage of low resistance to deformation during use, which is not desired by the user, is generally accepted.

There have already been numerous attempts to increase the resistance to deformation during pointing, without exceeding the limit for maximum permissible tensile stress values. However, these solutions very frequently influenced other properties of the RTV1 sealing compound in a disadvantageous manner. Thus, there is in principle the possibility of using high polymer viscosities. This would both increase the resistance to deformation during pointing and permit a low tensile stress value on a tensile load. However, this is subject to limits in that such extremely high polymer viscosities can no longer be handled technically. Moreover, the RTV1 sealing compounds would then have undesirably high stringiness during use.

EP-A1-857 750 proposes also mixing in polyalkylene oxides as rheology additives. However, these additives have a very disadvantageous effect on the required adhesion of the RTV1 sealing compound on various substrates. The field of use of the crosslinkable material is therefore very limited. The processes described to date for the continuous preparation of RTV1 sealing compounds present a further problem. In spite of the relatively small amounts of the reinforcing fillers which have to be mixed into the organosilicon compound, the continuous preparation of RTV1 compositions is difficult since the ingredients are pulverulent solids and highly viscous polymers which are very difficult to mix with one another.

The production of RTV materials is therefore effected in mixing units having very high-speed mixing members. Owing to the high speeds, a very large amount of reinforcing filler is to be mixed into the organosilicon compound in a short time. Thereafter, the high speeds are used for achieving as uniform a dispersion as is possible with the reinforcing filler. EP-A-1 008 613 describes, for example, a mixing turbine. By means of the high speeds of the rotor and small sheer gaps between rotor and wall, the mixed material is subjected to mechanical load so that the temperature of the mixture increases to above 100° C. EP-B-0 512 730 teaches the incorporation of finely divided silica into organopolysiloxanes with the aid of a twin-screw kneader. Here too, there is a considerable temperature increase of the material being mixed, owing to the high mechanical load during the mixing process. Independently of the mechanical load, the thermal load can also lead to damage to the RTV materials. Thus, for example, the shelf-life may be limited.

All described processes for the preparation of RTV materials additionally have, as a rule, the considerable disadvantage that extremely highly viscous mixed material has to be cooled again in a technologically very complicated manner after mixing, so that it can be introduced into moisture-tight containers, such as drums, cartridges or tubular bags. If the mixed material were too warm, the container would deform owing to the volume shrinkage after the cooling of the RTV1 sealing compound.

SUMMARY OF THE INVENTION

The invention relates to a process for the continuous preparation of mixtures containing organosilicon compound (A) and solid (B) and optionally further components in a mixing unit having at least one rotating mixing shaft, wherein at least one mixing shaft has an angle of inclination relative to the horizontal of more than 10 degrees and the inlet opening for the solid (B) is arranged higher than the outlet opening.

DETAILED DESCRIPTION OF THE PREFERRED EMBODIMENT(S)

The organosilicon compounds (A) used according to the invention may be any desired organosilicon compounds useful in mixtures with solids to provide materials crosslinkable by condensation reaction. Component (A) may comprise both pure siloxanes, i.e. $\equiv$Si—O—Si$\equiv$ structures, and silocarbanes, i.e. $\equiv$Si—R"—Si$\equiv$ structures where R" is a hydrocarbon radical which is divalent, optionally substituted or interrupted by heteroatoms or any desired copolymers having organosilicon groups.

The organosilicon compounds (A) used according to the invention are preferably those containing at least one unit of the formula

in which

R each may be identical or different and is an optionally substituted hydrocarbon radical, Y each may be identical or different and is a hydroxyl group or hydrolyzable radical, X each may be identical or different and is an oxygen atom or divalent organic radical, a is 0, 1, 2 or 3, preferably 1 or 2, and b is 0, 1, 2 or 3, preferably 0, 1 or 2, most preferably 0, with the proviso that the sum a+b is less than or equal to 3.

Radicals R are preferably monovalent hydrocarbon radicals having 1 to 18 carbon atoms, which are optionally substituted by halogen atoms, amino groups, ether groups, ester groups, epoxy groups, mercapto groups, cyano groups or (poly)glycol radicals, the latter being composed of oxyethylene and/or oxypropylene units, more preferably alkyl radicals having 1 to 12 carbon atoms, and in particular the methyl radical. However, radicals R may also be divalent radicals which link, for example, two silyl groups to one another.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals, such as the benzyl radical and the α- and the β-phenylethyl radicals.

Examples of substituted radicals R are substituted methyl radicals, the methoxyethyl radical, the ethoxyethyl radical, the ethoxyethoxyethyl radical, and the chloropropyl and trifluoropropyl radicals.

Examples of divalent radicals R are the ethylene radical, polyisobutylenediyl radicals and propanediyl-terminated polypropylene glycol radicals.

The groups Y may be hydroxyl radicals and any desired, optionally substituted hydrocarbon radicals bound to a silicon atom via an oxygen atom or nitrogen atom.

Radical Y is preferably a hydroxyl radical, radical —OR$^1$ such as the methoxy, ethoxy, n-propoxy, isopropoxy, n-butoxy, isobutoxy, s-butoxy, tert-butoxy and 2-methoxyethoxy radicals, R$^1$ being an optionally substituted hydrocarbon radical; acyloxy radicals such as the acetoxy radical; amino radicals such as the methylamino, dimethylamino, ethylamino, diethylamino and cyclohexylamino radicals; amido radicals such as the N-methyl-acetamido and benzamido radicals; aminoxy radicals such as the diethylaminoxy radical; oximo radicals such as the methylethylketoximo and methylisobutylketoximo radicals; and enoxy radicals such as the 2-propenoxy radical.

Examples of radicals R$^1$ are the monovalent radicals mentioned for R. Radicals R$^1$ are preferably alkyl radicals having 1 to 12 carbon atoms, most preferably the methyl or ethyl radical.

Radical Y is most preferably a hydroxyl radical, radical —OR$^1$ where R$^1$ has the abovementioned meaning, or acyloxy radical, in particular, an acetoxy, methoxy, or ethoxy radical.

Radical X is preferably an oxygen atom or divalent, SiC-bonded, optionally substituted hydrocarbon radical which may be interrupted by oxygen atoms. In particular, radical X is an oxygen atom. Examples of radical X are —O—, methylene, ethylene, propylene and the α,ω-bis(propylene) polypropylene oxide diradical.

Most preferably, organosilicon compounds (A) are those selected from the group consisting of compounds of the formula

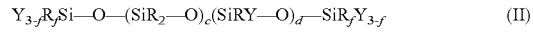

and compounds of the formula

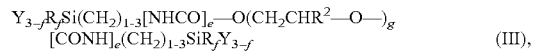

in which

R and Y may each be identical or different and have one of the abovementioned meanings, R$^2$ may be identical or different and is a hydrogen atom or a methyl group, c is 0 or an integer from 30 to 3000, preferably an integer from 30 to 3,000, d is 0 or an integer from 1 to 20, preferably 0 or 1, e may be identical or different and is 0 or 1, g is an integer from 30 to 3000 and f may in each case be identical or different and is 0, 1 or 2. Preferably, f is 2 if Y is —OH, and f is 1 or 0 if Y is different from —OH.

In particular, component (A) comprises organopolysiloxanes consisting of units of the formula (I) which most preferably have at least two radicals Y per molecule. The component A used in the process according to the invention is liquid under process conditions.

The organosilicon compounds (A) used according to the invention are preferably those which have a viscosity of from 30 to 10,000,000 mPa·s, more preferably from 1,000 to 5,000,000 mPa·s and, most preferably from 10,000 to 1,000,000 mPa·s, measured in each case at 25° C.

Examples of organosilicon compounds (A) are
(MeO)$_2$MeSiO[SiMe$_2$O]$_{30-2000}$SiMe(OMe)$_2$,
(AcO)$_2$MeSiO[SiMe$_2$O]$_{30-2000}$SiMe(OAc)$_2$
(HO)Me$_2$SiO[SiMe$_2$O]$_{30-2000}$SiMe$_2$(OH),
(EtO)$_2$MeSiO[SiMe$_2$O]$_{30-2000}$SiMe(OEt)$_2$,
(EtO)$_2$MorpholinomethylSiO[SiMe$_2$O]$_{30-2000}$SiMorpholinomethyl(OEt)$_2$,
(EtO)$_3$SiO[SiMe$_2$O]$_{30-2000}$SiMorpholinomethyl(OEt)$_2$,
(EtO)$_2$CyclohexylaminomethylSiO[SiMe$_2$O]$_{30-2000}$SiCyclohexylaminomethyl(OEt)$_2$,
(MeO)$_2$ViSiO[SiMe$_2$O]$_{30-2000}$SiVi(OMe)$_2$,
(MeO)$_2$MeSiO[SiMe$_2$O]$_{30-2000}$SiVi(OMe)$_2$, (AcO)$_2$ViSiO[SiMe$_2$O]$_{30-2000}$SiVi(OAc)$_2$,
(AcO)$_2$EtSiO[SiMe$_2$O]$_{30-2000}$SiEt(OAc)$_2$,
(Ox)$_2$MeSiO[SiMe$_2$O]$_{30-2000}$SiMe(Ox)$_2$,
(OX)$_2$ViSiO[SiMe$_2$O]$_{30-2000}$SiVi(Ox)$_2$,
(OX)$_2$MeSiO[SiMe$_2$O]$_{30-2000}$SiVi(Ox)$_2$,
(OX)$_3$SiO[SiMe$_2$O]$_{30-2000}$Si(Ox)$_3$ and
(EtO)$_2$ViSiO[SiMe$_2$O]$_{30-2000}$SiVi(OEt)$_2$, Me being a methyl radical, Et an ethyl radical, Vi a vinyl radical, Ac an acetoxy radical and Ox an ethylmethylketoximato radical.

Further examples of polymeric organosilicon compounds (A) are organic polymers having at least one group of the formula (I), such as polyisobutylene and copolymers of polyisobutylene with isoprene; polychloroprenes; polyisoprene; polyurethanes; polyesters; polyamides; polyacrylates; polymethacrylates; vinyl polymers; and polycarbonates.

The polymeric organosilicon compounds (A) used according to the invention may be homopolymers as well as copolymers, which in each case may be linear or branched. The organosilicon compounds (A) are commercially available products or can be prepared by methods customary in silicon chemistry.

The solids (B) used in the process according to the invention are preferably pulverulent solids which may be surface-treated and may contain physically and/or chemically bound water. They are most preferably those solids which can be fluidized, i.e. those which exhibit flow behavior which is comparable with that of liquids. The solid (B) used according to the invention preferably has a BET surface area of more than 1 m$^2$/g, more preferably from 1 to 400 m$^2$/g, and in particular from 50 to 250 m$^2$/g.

Examples of solids (B) used according to the invention are non-reinforcing fillers, i.e. fillers having a BET surface area of up to 50 m$^2$/g, such as quartz, diatomaceous earth, milled limestone, precipitated calcium carbonate, calcium silicate, zirconium silicate, zeolites, metal oxide powders, such as aluminas, titanium oxides, iron oxides or zinc oxides or mixed oxides thereof, barium sulfate, gypsum, silicon nitride, silicon carbide, boron nitride, glass powder, plastics powder such as polyacrylonitrile powder, and PTFE powder, fatty acid amides, e.g. ethylenebisstearamide, and finely divided hydrophobic polyurethanes; reinforcing fillers, i.e. fillers having a BET surface area of more than 50 m$^2$/g, such as pyrogenically prepared silica, precipitated silica, carbon black such as furnace black and acetylene black, and silicon-aluminum mixed oxides having a large BET surface area; and fibrous fillers such as plastics fibers. These fillers can be rendered water-repellant, for example by treatment with organosilanes or organosiloxanes, with stearic acid, or by etherification of hydroxyl groups to alkoxy groups.

Most preferably, solid (B) is hydrophilic or hydrophobic, pyrogenic or precipitated silica and precipitated or milled calcium carbonate, in particular calcium carbonate and pyrogenically prepared silicas.

If solid (B) is finely divided silica, then the silica preferably has a bulk density of less than 1,000 g/l (at 25° C. and the pressure of the ambient atmosphere), more preferably less than 200 g/l, and in particular from 10 to 120 g/l.

In the inventive process, preferably from 3 to 300 parts by weight, more preferably from 5 to 200 parts by weight, and in particular from 10 to 100 parts by weight of solid (B), based in each case on 100 parts by weight of component (A), are used.

The further constituents optionally used in the process may be any desired substances which are useful in mixtures containing organosilicon compounds and solids. The type and amounts depend on the respective field of use and are known to the person skilled in the art.

If it is intended, for example, to prepare crosslinkable materials by the process according to the invention, which is preferred, the components customary therein, such as crosslinking agents (C), catalysts (D), plasticizers (E), adhesion promoters (F) and additives (G) may be used as further constituents. The crosslinkable materials which can be prepared by the process are preferably materials crosslinkable by condensation reactions, materials crosslinkable by addition reactions, peroxidically crosslinkable materials, and radiation-crosslinkable materials, preferably condensation crosslinkable materials.

In the inventive process, crosslinking agents can, if desired, be used as a component (C). These may be any useful crosslinking agents having at least three crosslinkable radicals, preferably silanes or siloxanes having at least three condensable radicals.

Most preferably, the crosslinking agents (C) optionally used in the process according to the invention are tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidyloxy)propyltriethoxysilane, 1,2-bis(trimethoxysilyl)ethane, cyclohexylaminomethyltriethoxysilane, 4-(triethoxysilylmethyl)tetrahydro-1,4-oxazine, 1,2-bis(triethoxysilyl)ethane, methyltris(methylethylketoximo)silane, vinyltris(methylethylketoximo)silane, tetrakis(methylethylketoximo)silane, methyltriacetoxysilane, ethyltriacetoxysilane, vinyltriacetoxysilane, dimethyldiacetoxysilane, methylvinyldiacetoxysilane and partial hydrolysis products of these organosilicon compounds, for example, hexaethoxydisiloxane, which can optionally also be prepared by cohydrolysis, such as, for example, by cohydrolysis of methyltrimethoxysilane and dimethyldimethoxysilane.

In particular, the crosslinking agents (C) which are optionally used are tetraethoxysilane, tetrapropoxysilane, methyltriethoxysilane, vinyltriethoxysilane, phenyltrimethoxysilane, 1,2-bis(trimethoxysilyl)ethane, 1,2-bis(triethoxysilyl)ethane, cyclohexylaminomethyltriethoxysilane, 4-(triethoxysilylmethyl)tetrahydro-1,4-oxazine, methyltriacetoxysilane, ethyltriacetoxysilane, vinyltriacetoxysilane and the partial hydrolysis products thereof, in particular methyltrimethoxysilane, vinyltrimethoxysilane, methyltriethoxysilane, vinyltriethoxysilane, methyltriacetoxysilane, ethyltriacetoxysilane, vinyltriacetoxysilane and the partial hydrolysis products thereof.

If the optional crosslinking agents (C) are partial hydrolysis products of silanes, those having up to 10 silicon atoms are preferred. Although not explicitly mentioned, the optional crosslinking agents (C) may also have, as a result of their preparation, a small proportion of hydroxyl groups, preferably up to not more than 5% of all Si-bonded radicals. The crosslinking agents (C) are commercially available products or can be prepared by processes known in silicon chemistry.

If crosslinking agents (C) are used, the relevant amounts are preferably from 0.01 to 20 parts by weight, more preferably from 0.5 to 10 parts by weight, and in particular from 3 to 8 parts by weight, based in each case on 100 parts by weight of component (A). Preferably, crosslinking agent(s) (C) are used.

Examples of optional catalysts (D) are organic compounds of tin, zinc, zirconium, titanium and aluminum. Preferred among these condensation catalysts are butyl titanates and organic tin compounds, such as di-n-butyltin diacetate, di-n- butyltin dilaurate and reaction products of a silane having, as hydrolysable groups per molecule, at least two monovalent hydrocarbon radicals bonded via oxygen to silicon and optionally substituted by an alkoxy group or its oligomer with diorganotin diacylate, all valencies of the tin atoms in these reaction products being saturated by oxygen atoms of the group ≡SiOSn≡ or by SnC-bonded, monovalent organic radicals.

If catalysts (D) are used, the relevant amounts are preferably from 0.0001 to 5 parts by weight, more preferably from 0.001 to 2 parts by weight, based in each case on 100 parts by weight of the crosslinkable material.

Examples of optionally used plasticizers (E) are dimethylpolysiloxanes which are liquid at room temperature and are endcapped by trimethylsiloxy groups, in particular those having viscosities at 25° C. in the range from 10 to 1000 mPa·s, and high-boiling hydrocarbons, such as dialkylbenzenes, dialkylnaphthalenes or mineral oils consisting of naphthenic and paraffinic units, polyglycols, in particular polypropylene glycols, which may be optionally substituted, high-boiling esters, such as, for example, phthalates, citric acid esters or diesters of dicarboxylic acids, liquid polyesters or methacrylates and alkanesulfonic acid esters.

If plasticizers (E) are used in the process of the invention, the relevant amounts are preferably from 1 to 50 parts by weight, more preferably from 5 to 35 parts by weight, and in particular from 5 to 25 parts by weight, based in each case on 100 parts by weight of the crosslinkable material. Preferably, plasticizers (E) are used.

Examples of the adhesion promoters (F) optionally used in the process of the invention are silanes and organopolysiloxanes having functional groups, such as those having glycidyloxypropyl, amino or methacryloyloxypropyl radicals and tetraalkoxysilanes and siloxanes containing T- or Q-groups, which may optionally have alkoxy groups. If, however, another component, such as, for example, component (A) or (C) already has such functional groups, an addition of adhesion promoter can be dispensed with.

If adhesion promoters (F) are used in the inventive process, the relevant amounts are preferably from 0.001 to 10 parts by weight, more preferably from 0.01 to 5 parts by weight, and in particular from 0.1 to 5 parts by weight, based in each case on 100 parts by weight of the crosslinkable material.

Examples of optionally used additives (H) are pigments, dyes, fragrances, antioxidants, agents for influencing the electrical properties such as conductive carbon black, flame-retardant agents, light stabilizers and agents for increasing the skin formation time, such as silanes having an SiC-bonded mercaptoalkyl radical, cell-producing agents such as azodicarbonamide, heat stabilizers, and thixotropic agents such as polyethers and hydrogenated castor oil, organic solvents such as alkyl aromatics stabilizers, such as phosphoric acid esters, phosphonic acids, biocides such as fungicides, bactericides, and acaricides, dispersants, and modulus regulators such as polydimethylsiloxanes having a terminal OH group.

The amount of component (H) to be used in the process of the invention depends on the type of additive and is known to the person skilled in the art.

The components used in the process according to the invention may be in each case one type of such a component as well as a mixture of two or more types of a respective component.

Characteristic of the continuous process of the invention for mixing liquid organosilicon compound (A) with at least one solid (B) is that first the wetting of the solid with the liquid is effected both very rapidly and with little mechanical loading of the mixed material. Thereafter, depending on the requirements of the mixing task, the mixed material can be subjected to different mechanical loads in a targeted manner. The degree of mechanical loading after wetting is controlled in a targeted manner by adapting the speed of the mixing shafts and the residence time of the mixed material in the mixing unit, high speeds and a high filling level resulting in a greater mechanical load for a given mixing unit and given formulation. Thus, it is possible for the entire mixing task to be carried out very rapidly and with controllable mechanical load in a single process step.

Preferably, the solid is mixed in the mixing unit with liquid until, on visual assessment of the mixing quality, no solid fractions which have not been wetted are visible.

The mixing unit used in the process according to the invention preferably has a housing whose inner wall encloses the mixing space, and at least one rotating mixing member arranged therein. A rotating mixing member is to be understood as meaning that either the mixing member itself rotates or the housing rotates or both rotate, the rotating mixing member with stationary housing being preferred. Mixing units having a plurality of mixing members, in particular having two mixing members, are preferred.

The mixing member preferably consists at least of a rotating mixing shaft and a plurality of mixing elements arranged thereon. The quotient of length of the mixing shaft in the mixing space to the diameter of the maximum rotational cross section of the entire mixing member is preferably greater than 1, preferably from 1.5 to 30, and in particular from 2 to 10. In addition, the mixing shaft is preferably at least as long as the mixing space. The region along the mixing shaft, in which mixing elements are arranged, is the mixing zone. Preferably, the mixing zone is as long as the mixing space.

In the process according to the invention, the ratio of length of the mixing zone to diameter of the maximum rotational cross section of the mixing member is greater than 2:1, more particularly preferably from 3:1 to 30:1.

The mixing zone is the space over which the rotating mixing members pass, regions in which the mixed material is subject to laminar and turbulent flows caused by the rotational movement of the mixing member and by gravity.

The mixing space is equipped with at least one inlet opening for the starting components and at least one outlet opening for the mixed material. The inlet openings are preferably situated at the beginning of the mixing zone which is characterized by the wetting of the solid (B). The outlet opening for the mixed material is preferably arranged at the end of the mixing zone, based on the direction of transport of the mixed material from the beginning of the mixing zone to the end.

The transport of the mixed material along the mixing zone can be effected in two different ways which may supplement one another.

The mixed material can be forced through the mixing space, for example, by a higher pressure at the inlet opening than at the outlet opening. However, this is not preferred since there is then the danger of mixed material which is not completely wet breaking through. Preferably, the mixed material is transported by the mixing elements, which always have a certain transporting effect, or by additional transport elements. In addition to the action of the mixing elements, the mixed material is transported by the influence of gravity from the inlet opening in the direction of the outlet opening, owing to the inclined position of the mixing shaft.

In the process according to the invention, however, the process for transporting the mixed material is substantially reinforced by the inclined position, according to the invention, of the mixing shaft. For example, the organosilicon compound (A) carried along upward with the rotation of the mixing members, the preferably used pulverulent, in particular fluidizable solid (B) and optionally further components thus constantly fall a little way in the direction of the outlet opening. Furthermore, for example with every meeting of mixing elements, the mixed material is forced more strongly in the direction of the outlet opening than in the direction of the inlet opening since gravity has to be overcome in transporting the mixed material in the direction of the inlet opening.

In the process according to the invention, at least one of the mixing shafts makes an angle of from 10 to 90 degrees, preferably from 20 to 70 degrees, more preferably from 30 to 60 degrees, with the horizontal, based in each case on the division of the quadrant between the horizontal and the vertical into 90 degrees, preferably all mixing shafts make this angle with the horizontal.

This arrangement according to the invention ensures substantially more effective mixing of the starting components by enhanced transport of the non-wetted, preferably pulverulent, in particular fluidizable solid along the mixing shaft in the direction of the outlet opening than the horizontal orientations of the mixing shafts known to date in the preparation of RTV1 sealing compounds.

In the process of the invention, the circumferential velocity of the mixing members, in particular for limiting the mechanical load on the mixed material is preferably from 0.1 to 10 m/s, more preferably from 0.1 to 5 m/s, and in particular from 0.2 to 2.0 m/s. In the context of the present invention, circumferential velocity is to be understood as meaning the velocity at the outer circumference of the mixing members. The greatest mechanical loading of the mixed material usually takes place at this point, the mechanical loading of the mixed material being caused mainly by compressions and shears.

A further measure of the intensity of mechanical loading of the mixed material is the temperature increase of the mixed material caused by the mixing process. In the process of the invention, heating of the mixed material by the mechanical load is preferably not more than 30 K, more preferably from 0 to 20 K. For performing special mixing tasks, the use of cooled or heated mixing units in the inventive process may be advantageous. If the mixing unit is cooled, as, for example, with the use of double-jacket apparatuses, the preferred temperature increase is from −10 to 20 K, more preferably from 0 to 15 K, and in particular from 0 to 10 K. It is therefore possible, for example, to deliberately create conditions which utilize or prevent changes of states of aggregation, for example the liquefaction or vaporization of dispersants, which however is not preferred.

If desired, the mixing space may have a reduced or a superatmospheric pressure compared with the pressure of the ambient atmosphere, mixing at reduced pressure being preferred, for example at a pressure of from 50 to 200 hPa, and preferably takes place at temperatures of from −10 to 250° C., more preferably at from 10 to 60° C., and in particular at room temperature or under conditions such as those which result during mixing of the components.

On heating, which is not preferred, and on cooling, which is preferred, for example, the housing of the mixing unit as well as parts of the mixing member, such as, for example, cooled hollow mixing shafts, or additional internals, such as, for example, cooling coils, can be used for thermostating the mixed material.

If desired, different regions of the mixing space can also be operated with different process engineering parameters in the process according to the invention.

The difference between the volumes of mixing space and mixing zone, i.e. the so-called dead space, is as small as possible, it being possible for the mixing space to have any desired cross section. Ideally, the geometry of the inner wall of the housing is adapted to the geometry of the mixing zone.

When only one mixing shaft is present, the mixing space is preferably formed so as to be rotationally symmetrical since undesired product adhesions and dead spaces in the mixing space can most easily be avoided thereby. Most preferably, the mixing space is cylindrical or conical, in particular cylindrical. When a plurality of mixing shafts are present, the mixing space consists of a plurality of rotationally symmetrical mixing spaces which may also partly overlap, which is particularly preferred. The mixing space preferably has a volume of from 0.001 to 20 $m^3$, more preferably from 0.01 to 2 $m^3$.

In the process of the invention, mixing elements which in particular produce mixing of solid and liquid are arranged on the rotating mixing shaft. If a plurality of mixing shafts are arranged, which is preferred, two mixing shafts being very particularly preferred, a plurality of mixing zones result. Preferably, these mixing zones touch one another or overlap. The mixing zones most preferably overlap.

The mixing shafts are preferably arranged straight and with their axes parallel to one another, but they can also be arranged at an angle of up to 60 degrees to one another.

If a plurality of mixing members is present, the preferred quotient of length and diameter is to be based on the length of the longest mixing member and the diameter on the diameter of the respective largest rotational cross section of one of the mixing members.

In the case of the mixing unit used according to the invention, the distance between rotating mixing elements and the inner wall of the housing is as small as possible, with the result that the possibilities of deposits of the mixed material of the inner wall are reduced. Thus, a maximum distance between mixing element and inner wall of 10 cm is preferred, more preferably a distance of not more than 5 cm, the distance in particular being from 0.1 to 2.0 cm.

Preferably, the mixing shafts have lengths of from 0.5 to 20 m, lengths of from 1 to 10 m being particularly preferred, and preferably, are formed so as to be compact, i.e. they are rigid and do not deform under the conditions of mixing, or do so only to an insignificant extent. However, it is possible to arrange parts so as to be moveable in a targeted manner, which results in cleaning of the mixing member or of the inner wall, for example on change of direction of rotation.

It is also possible to install a plurality of mixing shafts one behind the other or side by side so that they are arranged in an annular manner around a fixed core. Thus, the mixing shafts, in each case independently of one another, may have any desired rotational velocities and directions of rotation. Thus, for example, two mixing shafts can move in opposite directions or in the same direction relative to one another. If mixing units having a plurality of mixing shafts are used in the process according to the invention, the mixing shafts preferably have a co-rotating movement.

Just as the mixing elements described can be arranged on the mixing shaft, the arrangement of mixing elements on the inner wall of the mixing unit is also possible but not preferred. If only one mixing member is present, the additional arrangement of mixing elements on the inner wall is preferred.

The speeds of the mixing shafts can be chosen as desired; speeds of from 10 to 200 revolutions per minute are preferred, more preferably from 10 to 150 revolutions per minute, and in particular from 30 to 120 revolutions per minute.

If desired, the mixing shafts can also carry out additional short movements in the direction of their longitudinal axis at any desired frequency in order, for example, to repel adhering product or to bring about particular mixing effects, which, however, is not preferred.

Furthermore, in the inventive process, the mixing shaft can project freely into the mixing space without contact with the inner wall and without support or can be mounted at any desired points of the mixing unit, such as, for example, in the upper region of the mixing space, in the lower region of the mixing space or in the middle.

In the process according to the invention, any desired mixing elements and all mixing elements known to date can be used as mixing elements. They may have any desired shape and size, provided that they do not hinder the rotational movement of the mixing shaft. Thus, the mixing elements may also have a different shape and size within a mixing member.

The mixing elements may be structures arranged as desired on the mixing shaft and on the inner wall of the housing, provided that they do not hinder the rotational movement. The mixing elements are arranged on the mixing shafts or the inner wall in such a way, or are operated in such a way, that a minimum distance of not more than 20 cm results when the mixing elements meet one another through the rotational movement of the mixing members, a distance of not more than 10 cm being preferred and a distance of from 0.1 to 5 cm being very particularly preferred.

In the process according to the invention, the shape of the mixing elements and the arrangement thereof on the shaft and/or inner wall is preferably chosen so that the mixing elements transport the mixed material in a targeted manner along the mixing shaft. The transport effect can be achieved, for example, if the mixing elements are arranged as parts of one or more conveying screws. Thus, for example, the front edge is arranged toward the inlet opening and the rear edge toward the outlet opening, based on the direction of rotation, it being possible for the sheet-like mixing elements to be flat or curved. Preferred examples are disk-shaped or screw-shaped embodiments which may be interrupted in the surface.

Furthermore, T-shaped mixing elements are preferably arranged on the mixing shafts, T-shaped embodiments which intermesh being very particularly preferred, as described in U.S. Pat. No. 3,880,407, which is herein incorporated by reference. Most preferably, the T-shaped mixing elements on a shaft have the same size, with the result that the mixing member as a whole is cylindrical. These T-shaped mixing elements are preferably arranged in a screw-like manner on the mixing shaft.

In addition to the mixing elements resulting in transporting of the mixed material, it is also possible, according to the invention, to arrange those mixing elements which change the movement of the mixed material as desired in order, for example, to achieve particular mixing effects. Thus, for example, portions of the mixed material can be transported short distances in a targeted manner in a direction opposite to the general transport direction.

The installation of special scrapers which are strip-like and move a small distance away from the inner wall is also possible and preferred, with the result that the mixed material is intensively separated from the inner wall. They are preferably arranged rigidly on the mixing shaft.

The mixing members used in the process according to the invention have diameters of the maximum rotational cross section of preferably from 0.1 to 5 m, more preferably from 0.2 to 2 m, and in particular from 0.5 to 1 m.

In the process according to the invention, the inlet openings at the mixing space can be designed as desired for the components to be mixed. Thus, it is possible to add all components through one inlet opening, which however is not preferred. Preferably at least two inlet openings are present. If two inlet openings are present, the inlet opening for the solid (B) most particularly preferably arranged before the opening for the organosilicon compound (A). If further components (C) to (H) are to be added, these can be metered either through one of the two inlet openings already described or through separate openings, which are then preferably present after the inlet openings for organosilicon compound (A) and solid (B). It is also possible to meter some or all of the components (C) to (H) with the organosilicon compound (A) in premixed form, which is preferred.

Preferably, the inlet opening for the solid (B) and in particular the inlet opening for the organosilicon compound (A) is present directly above a mixing shaft or, which is particularly preferred, directly above the overlap region of two mixing zones. The inlet opening for organosilicon compound (A) can, however, also be arranged in the region of the circumference of the inner wall, which however is not preferred.

While liquid components are preferably transported by means of pumps into the mixing space in the process according to the invention, solids preferably enter the mixing space through freefall.

For example when working under atmospheric pressure, the inlet opening for the solid is particularly preferably arranged and designed so that air or inert gasses entrained by the solid can easily escape through the inlet opening itself or through a further opening. The opening for the escape of air or inert gasses is led in the form of a shaft far upward so that entrained solid particles can sink again. In addition, this opening can be closed by filter devices so that the solid particles are not released to the environment.

If the process is to be carried out in vacuo, the air entrained with the starting components or an inert gas can be removed through an additional vacuum opening, which is preferably designed in the form of a dome known per se. This vacuum opening can be arranged at any desired point. It is preferably arranged at the beginning of the mixing zone in the upper region of the mixing space.

A preferred possibility for carrying out the mixing process at low pressures consists in subjecting the solid (B) to a reduced pressure even before the metering into the mixing space, a gas displacement pipe being known to the person skilled in the art preferably being installed between solid reservoir and mixing unit in this case. In addition, metering openings for portions of solid, liquid or any desired further mixing constituents can be arranged at any desired point of the mixing unit.

In the case of the mixing units used in the process of the invention, the outlet openings can be arranged in any desired shape and size at any desired points of the mixing space at the end of the mixing zone. The outlet opening can be mounted, for example, at the rear end of the mixing zone, e.g. on the end face of the mixing space, which is preferred. However, it can also be arranged tangentially at the rear end of the mixing zone in the circumference of the housing.

A discharge device, such as, for example, a discharge double screw or a gear pump, which transports the mixed material for further processing, is preferably present in the region of the outlet opening. This further processing may comprise, for example, devolatilization steps, incorporation of further mixing constituents, such as catalysts, pigments or adhesion promoters, cooling of the mixed material or filling into any desired containers.

In the preparation of materials crosslinkable by condensation reaction, the materials are preferably stored in moisture-tight containers or introduced into moisture-tight containers directly after discharge from the mixing unit. Direct filling without intermediate storage presupposes that the crosslinkable material already contains all desired mixing constituents and cooling of the mixed material is not necessary because the temperature of the mixed material is, for example, below 45° C. In all process steps, it is possible to operate in the absence of atmospheric humidity.

If it is intended to mix additional constituents, such as color pastes or fungicides, into the crosslinkable material obtained by the process according to the invention, this is preferably effected using, for example, static mixers instead of rotating, in particular rapidly rotating, mixing members.

The process according to the invention has the advantage that homogeneous mixtures can be prepared continuously in a simple manner, and also that mixing of liquid organosilicon compounds with pulverulent solids can be carried out in a gentle manner and with very little mechanical loading of the mixed material. Furthermore, the process has the advantage that pulverulent solids having a low bulk density are very rapidly wetted.

The process has the advantage that low-modulus sealing compounds can be prepared with very good "body", and that the entire RTV1 preparation is possible in one unit without additional process steps. Easy removal of gaseous components is possible, and only minimum maintenance and cleaning of the mixing unit are required. The process has the additional advantage that, owing to only slight heating of the product, it can be carried out so as to protect the product and in an economical manner, virtually no local overheating of the mixed material taking place.

In the examples described below, all viscosity data relate to a temperature of 25° C. Unless stated otherwise, the examples below are carried out at a pressure of the ambient atmosphere, i.e. at about 1000 hPa, and at room temperature, i.e. at about 23° C., or at a temperature which results on combination of the reactants at room temperature without additional heating or cooling. Furthermore, all data relating to parts and percentages are based on weight, unless stated otherwise.

The Shore A hardness is determined according to DIN (Deutsche Industrie Norm [German Industrial Standard]) 53505-87. The tensile strength is determined according to DIN 53504-85 S2. The elongation at break is determined according to DIN 53504-85 S2. The modulus is the stress value at 100% strain.

For quantitative determination of the "body" of sealing compounds, a method of measurement which makes it possible to measure relative differences between differently prepared materials and different formulations was developed. For this purpose, the samples are thermostated at 23° C. for 2 h before the measurement. A 50 ml PE beaker having a diameter of 50 mm is overfilled, without air bubbles, with the material to be tested. In order to obtain a smooth surface, the surface of the sealing compound is scraped smooth and flush with the edge. In this sample prepared in this manner, a test specimen which has the form of a hemisphere having a diameter of 25 mm and a 5 mm cylindrical extension is immediately pressed 20 mm deep into the sample at 60 mm/min using a type 1425 tensile tester from ZWICK (200 N load cell). The measured maximum force is the penetration force. The greater the penetration force, the better the "body".

Example 1

Preparation of a Neutrally Crosslinking RTV1 Sealing Compound

A mixing unit which had a mixing space of about 30 l was equipped with two mixing shafts on which T-shaped mixing elements of the same size which intermeshed with one another were present. The quotient of length and diameter of the mixing member was about 3. The individual mixing elements were arranged on the mixing shaft in rows which had the form of a helix with a 4% positive pitch. Five such rows were arranged on one shaft and four on the other. As a result of this, the speeds of the two shafts had to be operated in a ratio of 4:5. Below, only the respective higher speed is stated. The mixing space had the shape of two cylinders overlapping in the form of a horizontal figure eight. Each of these cylinders had a diameter of about 200 mm. Mixing units of this type are commercially available, for example, from LIST, Arisdorf, Switzerland. The device was equipped with a double jacket for cooling or heating, which however was not used. A slot of about 100×20 mm was present on the end face at the end of the mixing space. Adjacent to this was a double screw for the further transport of the mixed product for filling into moisture-tight PE cartridges. This unit was installed at an angle of 30 degrees to the horizontal, resulting in gravity-enhanced transport of the mixed material in a downward direction toward the end of the mixing shafts.

At the upper end of the mixing shaft, an opening of about 150 mm in diameter through which the solid (B) was fed in freefall from a gravimetric feeder via a flexible hose was present above the overlap region of the mixing zones. A further opening of about 10 mm diameter, through which a premix of all further liquid components was added, was arranged at a distance of about 30 mm along the mixing zone below this first inlet opening, likewise above the overlap region of the mixing zones.

A pressure (P1) of the ambient atmosphere of 1000 hPa prevailed at the inlet opening for the solid (B). The starting materials were stored at room temperature for several days.

First, a mixture of 307 kg of a polydimethylsiloxane mixture, in which the siloxanes are terminated by dimethoxymethylsilyl and/or dimethoxyvinylsilyl groups and the ratio of terminal dimethoxymethylsilyl groups to terminal dimethoxyvinylsilyl groups is about 1:1, having a viscosity of 80,000 mPa·s, 138 kg of an α,ω-bistrimethylsilyloxypolydimethylsiloxane having a viscosity of 1,000 mPa·s, 14 kg of methyltrimethoxysilane, 2 kg of vinyltrimethoxysilane, 9 kg of an adhesion promoter which is prepared by reacting one part of aminopropyltriethoxysilane with one part of methyltriethoxysilane hydrolysis product having an ethoxy content of 37%, 3.5 kg of aminopropyltrimethoxysilane, 1.8 g of a reaction product of dibutyltin diacetate with tetraethoxysilane in the molar ratio 1:2, the resulting methyl acetate having been distilled off, and 1.1 kg of a 50 weight percent by solution of octylphosphonic acid in methyltrimethoxysilane was prepared.

50 kg/h of this mixture were metered into the unit described above. At the same time, 4.8 kg/h of finely divided silica having a BET surface area of 150 m²/g (commercially available under the name HDK® V15 from Wacker Chemie AG, Munich, Germany) were metered through the above-described opening for the solid (B). The components were mixed at a speed of 40 min⁻¹.

The unit was first operated for 16.5 min without discharge, resulting in a final amount of about 15 kg. Thereafter, discharge of 54.8 kg/h of the mixed product was begun by putting the discharge screw into operation.

After the experiment had run for one hour, samples were introduced into commercially available polyethylene cartridges. At this time, the temperature at the end of the mixing zone was 26° C.

Before the assessment, the product was freed from enclosed gas bubbles by application of a vacuum. A homogeneous mixture which also remains homogeneous on storage over several months in a 300 ml PE cartridge was obtained. No inhomogeneities due to local crosslinking of the mixture form.

For assessment of the appearance, the material was applied to a glass plate in a layer about 0.1 mm thick. The material appeared to be homogeneous and smooth.
Penetration force 4.41 N
Stress at 100% strain 0.29 MPa
Tensile strength 1.1 MPa
Elongation at break 560%
Hardness 16 Shore A Example 2

The experiment of example 1 was repeated, except that the mixing space and the feed apparatus of the finely divided silica were placed under a vacuum of about 200 hPa during the metering of the components.

In contrast to example 1, a product free of gas bubbles was obtained at the discharge, which could therefore be used without further process steps.

The properties of the product thus obtained:
Appearance: smooth, homogeneous
Penetration force 4.2 N
Stress at 100% strain 0.29 MPa
Tensile strength 1.1 MPa
Elongation at break 500%
Hardness 16 Shore A Comparative Example 3

The experiment of example 1 was repeated. In contrast to this experiment, the mixing shafts of the mixing unit had an inclination of 0° relative to the horizontal.

It was initially found that, under the mixing conditions of example 1, the amount of mixed product discharged was substantially smaller than the sum of the metered amounts of the starting materials, which led to continuous filling of the mixing unit. In order to prevent this, the speed was increased to 60 min$^{-1}$. Thereafter, an amount of mixed product equivalent to the metered amounts could be discharged. After about 1 h, samples were taken and assessed, it having been found that the mixture was still very inhomogeneous. Substantial inhomogeneities were visible. The temperature at the end of the mixing zone was 35° C.
Appearance: inhomogeneous, rough
Penetration force 3.39 N
Stress at 100% strain 0.29 MPa
Tensile strength 0.7 MPa
Elongation at break 400%
Hardness 14 Shore A While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the continuous preparation of component mixtures comprising continuously introducing at least one liquid organosilicon compound (A) and at least one solid (B), and optionally further components, into a mixing unit comprising at least one rotating mixing shaft disposed in a mixing space, wherein at least one mixing shaft is inclined from horizontal by an angle of more than 10 degrees and the inlet opening for the solid (B) is arranged higher than the outlet opening, mixing and wetting the solid (B) with the liquid organosilicon compound (A) and withdrawing a liquid product from the outlet opening, wherein the organosilicon compounds (A) contain at least one unit of the formula $$R_a Y_b SiX_{(4-a-b)/2} \qquad (I),$$

in which
R each are identical or different optionally substituted hydrocarbon radicals,
Y each are identical or different and, are a hydroxyl group or hydrolyzable radical,
X each are identical or different and are an oxygen atom or a divalent organic radical,
a is 0, 1, 2 or 3, and
b is 0, 1, 2 or 3,
with the proviso that the sum a+b is less than or equal to 3, and wherein the component mixtures are RTV1 moisture curable compositions.

2. The process of claim 1, wherein component (B) comprises at least one pulverulent solid.

3. The process of claim 1, wherein the mixtures are crosslinkable materials.

4. The process of claim 1, wherein the mixing unit has a plurality of mixing shafts.

5. The process of claim 1, wherein at least one of the mixing shafts makes an angle of from 10 to 90 degrees with the horizontal.

6. The process of claim 1, wherein the temperature increase of the mixed material due to mechanical loading during mixing is not more than 30 K.

7. The process of claim 1, wherein the mixing space is cylindrical or conical.

8. The process of claim 1, wherein the mixing elements are T-shaped mixing elements.

9. The process of claim 1, wherein the mixing unit comprises a chamber formed by the overlap of two parallel cylindrical mixing zones, each cylindrical mixing zone containing a rotating shaft having mounted thereon a plurality of mixing elements, rotating mixing elements in each cylindrical mixing zone overlapping with rotating mixing elements in the other cylindrical mixing zone.

10. The process of claim 9, wherein the mixing elements are T-shaped mixing elements.

11. The process of claim 9, wherein the mixing shaft is inclined at an angle from horizontal, of 30 to 60°.

12. The process of claim 1, wherein the solid (B) comprises pyrogenic silica.

13. The process of claim 1, wherein the mixing unit contains a mixing space, a mixing member comprising a rotating shaft having mixing elements disposed thereon, wherein the ratio of the length of the mixing space to a maximum rotational cross section swept by the mixing elements is greater than 2:1.

14. The process of claim 1, wherein the mixing unit contains a mixing space, a mixing member comprising a rotating shaft having mixing elements disposed thereon within the mixing space, the mixing space having a length along a direction parallel to a longitudinal axis of the rotating shaft within the mixing space, the mixing space having a length along a direction parallel to a longitudinal axis of the rotating shaft, wherein the ratio of the length of the mixing space to a maximum rotational cross section swept by the mixing elements is greater than 3:1 and less than 30:1.

15. The process of claim 1, wherein the mixer contains at least one mixing shaft, and the axis of each mixing shaft is inclined from horizontal by from 20 to 70°.

* * * * *